(12) United States Patent
Burd (10) Patent No.: US 9,193,462 B2
(45) Date of Patent: *Nov. 24, 2015

(54) MEAL CART FOR AN AIRCRAFT GALLEY (71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/528,835

(22) Filed: Oct. 30, 2014

(65) Prior Publication Data

US 2015/0048581 A1   Feb. 19, 2015

Related U.S. Application Data

(63) Continuation of application No. 13/554,172, filed on Jul. 20, 2012, now Pat. No. 8,936,260.

(51) Int. Cl.
| | |
|---|---|
| B62B 3/10 | (2006.01) |
| B64D 11/00 | (2006.01) |
| B62B 3/00 | (2006.01) |

(52) U.S. Cl.
CPC .......... *B64D 11/0007* (2013.01); *B62B 3/003* (2013.01); *B62B 3/004* (2013.01); *B62B 3/005* (2013.01); *B62B 2202/021* (2013.01); *B62B 2202/67* (2013.01); *B62B 2501/065* (2013.01)

(58) Field of Classification Search
CPC .............. B62B 2202/67; B62B 2501/065; B64D 11/0007; A47B 31/00; A47B 2031/002
USPC .............. 280/47.34, 47.35, 79.3, 79.11, 79.7, 280/79.2; 292/7, 16, 32, 158, 161, 162
See application file for complete search history.

(56) References Cited

U.S. PATENT DOCUMENTS

| | | | | |
|---|---|---|---|---|
| 2,575,661 | A | * | 11/1951 | Hickey ........................ 211/85.14 |
| 2,974,611 | A | | 3/1961 | Tangeman |
| 3,218,090 | A | | 11/1965 | Herman |
| 3,472,392 | A | * | 10/1969 | Hahn ........................ 211/126.14 |
| 3,590,727 | A | | 7/1971 | Shevlin |
| 3,735,898 | A | * | 5/1973 | Smith ........................ 222/129.4 |

(Continued)

FOREIGN PATENT DOCUMENTS

| | | |
|---|---|---|
| AU | 2008201445 A1 | 10/2008 |
| DE | 3106632 A1 | 9/1982 |
| JP | 2002078535 A | 3/2002 |

OTHER PUBLICATIONS

International Search Report, 5 pages, Nov. 7, 2013, from PCT/US2013/050370, published as WO2014/014784 on Jan. 23, 2014.

*Primary Examiner* — Brodie Follman
(74) *Attorney, Agent, or Firm* — Fulwider Patton LLP (57) ABSTRACT

A service cart for an aircraft is disclosed with a housing of carbon fiber reinforced composites forming a multi-compartment carrier, the carrier adapted to hold four standard airline meal carriers. The cart includes at least a pair of cap doors at opposite ends of the cart, each cap door pivoting approximately 270 degrees to bear against a side of the cart, and a plurality of guides on inner walls of the multi-compartment for retaining the standard airline meal carriers. To prevent the doors of the cart from inadvertently opening, the cart also may include a redundant paddle latch system for each door.

6 Claims, 6 Drawing Sheets

(56) References Cited

U.S. PATENT DOCUMENTS

| | | |
|---|---|---|
| 3,854,616 A | 12/1974 | Johnston |
| 3,868,123 A * | 2/1975 | Berg et al. .................. 280/79.2 |
| 3,908,749 A | 9/1975 | Williams |
| 3,966,286 A | 6/1976 | Groseclose |
| 3,974,658 A | 8/1976 | Starrett |
| 4,019,793 A * | 4/1977 | Gerding ...................... 312/209 |
| 4,022,404 A | 5/1977 | Greiss |
| 4,055,317 A | 10/1977 | Greiss |
| 4,103,736 A * | 8/1978 | Colato et al. ................ 165/48.1 |
| 4,110,587 A | 8/1978 | Souder, Jr. et al. |
| 4,278,697 A | 7/1981 | Liebermann |
| 4,397,159 A | 8/1983 | Dodd |
| 4,399,667 A | 8/1983 | Lamb |
| 4,560,859 A | 12/1985 | Brennan |
| 4,670,227 A | 6/1987 | Smith |
| 4,697,711 A | 10/1987 | Noren |
| 4,886,286 A | 12/1989 | Whorton et al. |
| 4,895,382 A | 1/1990 | Andersson |
| 4,898,294 A | 2/1990 | Jennings |
| 4,936,377 A * | 6/1990 | DeVogel et al. ................ 165/47 |
| 4,951,486 A | 8/1990 | Braun et al. |
| 5,001,977 A * | 3/1991 | Tracy .......................... 100/102 |
| 5,056,194 A * | 10/1991 | Huber ............................ 16/366 |
| 5,069,273 A | 12/1991 | O'Hearne |
| D325,111 S | 3/1992 | Lindhardt et al. |
| 5,205,628 A * | 4/1993 | Swets et al. .................. 312/216 |
| 5,235,833 A * | 8/1993 | Pinto ............................ 70/471 |
| 5,465,660 A | 11/1995 | Conti et al. |
| 5,466,915 A | 11/1995 | Meier et al. |
| 5,490,455 A | 2/1996 | Conti et al. |
| 5,531,464 A | 7/1996 | Maurer et al. |
| 5,605,344 A | 2/1997 | Insalaco et al. |
| 5,618,149 A | 4/1997 | Beaumont et al. |
| 5,626,353 A | 5/1997 | Campbell |
| 5,715,953 A | 2/1998 | Brown |
| 5,755,337 A | 5/1998 | Linn |
| 5,829,767 A * | 11/1998 | Grossman .................. 280/47.35 |
| 5,895,104 A | 4/1999 | Grandi |
| 5,947,494 A | 9/1999 | Thoegersen et al. |
| 5,975,202 A | 11/1999 | Grandi |
| 5,979,917 A | 11/1999 | Thoegersen et al. |
| 5,992,411 A | 11/1999 | Ayot et al. |
| 6,034,355 A | 3/2000 | Naderi et al. |
| 6,059,390 A | 5/2000 | Salomaa |
| 6,068,356 A | 5/2000 | Giuseppe et al. |
| 6,097,014 A | 8/2000 | Kirsch |
| 6,106,084 A * | 8/2000 | Thogersen et al. ............. 312/306 |
| 6,135,706 A | 10/2000 | Marti et al. |
| 6,139,034 A * | 10/2000 | Williams .................. 280/47.35 |
| 6,203,036 B1 | 3/2001 | LaVaute |
| 6,234,498 B1 | 5/2001 | Saku et al. |
| 6,272,394 B1 | 8/2001 | Lipps |
| 6,295,829 B1 | 10/2001 | Gibot |
| 6,340,136 B1 | 1/2002 | Luria |
| 6,344,630 B1 | 2/2002 | Jarvis et al. |
| 6,357,806 B1 * | 3/2002 | Saku ............................ 292/182 |
| 6,392,201 B1 | 5/2002 | Owens |
| 6,412,603 B1 | 7/2002 | Nervig et al. |
| 6,454,208 B1 | 9/2002 | Nervig et al. |
| 6,464,169 B1 | 10/2002 | Johnson et al. |
| 6,533,372 B1 | 3/2003 | McCrossin et al. |
| 6,547,084 B2 | 4/2003 | Bauman et al. |
| 6,619,770 B1 | 9/2003 | Drab et al. |
| 6,721,624 B2 | 4/2004 | Ostro |
| 6,797,879 B2 | 9/2004 | Leyda et al. |
| 6,908,125 B2 | 6/2005 | Crisp |
| 6,913,167 B2 | 7/2005 | Phelps et al. |
| 6,941,764 B2 | 9/2005 | Leroy et al. |
| 6,971,608 B2 | 12/2005 | Harrington et al. |
| 6,988,078 B1 * | 1/2006 | Heidenreich et al. ........... 705/22 |
| 7,044,335 B2 | 5/2006 | Aguirre et al. |
| 7,100,872 B2 | 9/2006 | Quan |
| 7,170,747 B2 | 1/2007 | Muirhead et al. |
| 7,287,820 B2 | 10/2007 | Van Loon et al. |
| 7,458,441 B2 | 12/2008 | Hu |
| 7,544,915 B2 | 6/2009 | Hu |
| 7,549,606 B2 | 6/2009 | Quan |
| 7,615,727 B2 | 11/2009 | Walter |
| 7,661,459 B2 | 2/2010 | Wesley et al. |
| 7,942,430 B2 | 5/2011 | Van Loon et al. |
| 8,087,611 B2 | 1/2012 | Arnold et al. |
| 8,319,160 B2 | 11/2012 | Koschberg et al. |
| 8,360,447 B2 | 1/2013 | Knoppers |
| 8,434,632 B2 | 5/2013 | Boubeddi et al. |
| 8,465,030 B2 | 6/2013 | Boivin et al. |
| 8,474,274 B2 | 7/2013 | Schalla et al. |
| 8,936,260 B2 * | 1/2015 | Burd .......................... 280/47.35 |
| 2001/0007323 A1 | 7/2001 | Clothier et al. |
| 2001/0010419 A1 | 8/2001 | Kasuya |
| 2003/0005830 A1 | 1/2003 | Citterio et al. |
| 2003/0213718 A1 | 11/2003 | Ducharme et al. |
| 2003/0218307 A1 | 11/2003 | Anderson et al. |
| 2004/0186760 A1 | 9/2004 | Metzger |
| 2004/0194487 A1 | 10/2004 | Leroy et al. |
| 2004/0194811 A1 | 10/2004 | Carhuff et al. |
| 2004/0201967 A1 | 10/2004 | Muirhead et al. |
| 2004/0207168 A1 * | 10/2004 | Raab et al. ................... 280/79.2 |
| 2004/0222646 A1 * | 11/2004 | Crisp ............................ 292/317 |
| 2004/0233055 A1 | 11/2004 | Canich et al. |
| 2005/0028543 A1 | 2/2005 | Whitehead et al. |
| 2005/0077806 A1 | 4/2005 | Schellenberg |
| 2005/0133308 A1 | 6/2005 | Reysa et al. |
| 2005/0193760 A1 * | 9/2005 | Moran et al. .................... 62/371 |
| 2005/0212239 A1 * | 9/2005 | Carter ........................ 280/47.35 |
| 2005/0218615 A1 * | 10/2005 | Hu ............................. 280/47.35 |
| 2006/0055290 A1 * | 3/2006 | Schalla ....................... 312/223.1 |
| 2006/0061243 A1 * | 3/2006 | Van Loon et al. ............ 312/330.1 |
| 2006/0070814 A1 * | 4/2006 | Hu .................................. 186/45 |
| 2006/0085308 A1 | 4/2006 | Metzger |
| 2006/0097876 A1 | 5/2006 | Retali et al. |
| 2006/0289698 A1 | 12/2006 | Quan |
| 2007/0266912 A1 | 11/2007 | Swain |
| 2008/0116773 A1 * | 5/2008 | Van Loon et al. ............. 312/198 |
| 2008/0120187 A1 * | 5/2008 | Wesley et al. .................... 705/15 |
| 2008/0172295 A1 * | 7/2008 | Watson ........................... 705/14 |
| 2008/0172855 A1 | 7/2008 | Schalla |
| 2008/0216368 A1 * | 9/2008 | Delamere ....................... 40/590 |
| 2008/0276840 A1 * | 11/2008 | Van Loon et al. ............... 108/33 |
| 2009/0044547 A1 * | 2/2009 | Oswald ............................ 62/89 |
| 2010/0050665 A1 * | 3/2010 | Oswald et al. .................... 62/89 |
| 2010/0140890 A1 * | 6/2010 | Boivin et al. ............... 280/47.34 |
| 2010/0155301 A1 * | 6/2010 | Koschberg et al. ............ 219/672 |
| 2010/0301037 A1 * | 12/2010 | Wust ............................. 219/620 |
| 2011/0025006 A1 * | 2/2011 | Knoppers ................. 280/47.34 |
| 2011/0233882 A1 | 9/2011 | Belanger et al. |
| 2011/0248458 A1 * | 10/2011 | Belanger et al. ........... 280/47.35 |
| 2011/0277489 A1 * | 11/2011 | Schalla et al. .................... 62/89 |
| 2011/0278879 A1 * | 11/2011 | Belanger et al. ......... 296/187.01 |
| 2012/0103206 A1 | 5/2012 | Doaran et al. |
| 2013/0257065 A1 * | 10/2013 | Burd ............................ 292/175 |
| 2013/0257067 A1 * | 10/2013 | Burd ............................ 292/200 |
| 2014/0021690 A1 * | 1/2014 | Burd .......................... 280/47.35 |

* cited by examiner

MEAL CART FOR AN AIRCRAFT GALLEY

CROSS-REFERENCES TO RELATED APPLICATIONS

This application is a continuation application which claims priority from U.S. application Ser. No. 13/554,172, filed Jul. 20, 2012 incorporated by reference in its entirety.

BACKGROUND

Airlines have sought to provide more services during flights to entice customers to choose their product in a competitive market. From entertainment to culinary offerings, the airlines are continuously seeking new and better ways to service their passengers in all aspects of the industry. In particular, the food and beverage service is a significant consideration in the design and layout of the aircraft. One aspect of current emphasis is the beverage service, and how to get the beverages to the passengers without disrupting the passengers while providing a manageable and maneuverable mode of distributing the drinks.

In order to provide a catering service to passengers aboard short, medium and long range flights a food and beverage area, or "galley," is used to store food and beverages, and also house mobile catering carts. These carts perform a number of functions related to the delivery, storage and distribution of either cold or combined hot and cold meals and beverages on the aircraft. One common industry practice is to store meals in coolers within the galley to ensure that they are fit for consumption by the passengers throughout the flight. This is especially true if the is route is classed as "long haul" i.e. taking several hours. If a portion of the meals require heating, the trays are placed in a dry or steam oven just prior to service to the customer.

To place the meals in the galley oven, they are commonly stacked in a shelved metallic open ended box known as a "meal carrier." To place the meals in the meal carrier they have to be loaded individually from the galley carts, or in some cases from additional storage that is provided in meal boxes (also known as standard units or SUs).

For long haul flights, the chilling of the compartment that house the meal boxes may required for food safety reasons, especially where the service includes more than one cooked meal during the flight. This chilling of the meal boxes is commonly known as "compartment" or "above work deck" (AWD) chilling. Alternatively, another practice is to store the meals in conventional service carts below the level of the work deck, also known as "cart bay" or "below work deck" (BWD) chilling. In this case, the meals are individually taken out of their carrier and placed in the oven to cook, whereupon they are taken back out of the oven individually and replaced in the cart.

To distribute the hot food to the passengers, a common practice is to load the heated meals into a temporary container that is placed on top of the cart along with hot water and coffee containers. During meal service, the hot food is combined with the balance of the meal, usually stored in the serving cart on plastic meal trays. To store sufficient food for large PAX capacity aircraft there can be a substantial number of service carts required, and the unladen weight of these carts can add significantly to the operational weight of the aircraft. There is a need for a more practical, light weight solution to this problem.

Moreover, as part of the flight operation of an aircraft the crew cabin may be required to perform a number of functions in the course of their duties. These can range from conventional meal service to duty free sales and trash collection. In an emergency situation where a galley chilling system has failed, it is common practice to provide temporary chilling for an individual cart by loading a block of dry ice in the cart, where the dry ice keeps the contents of the cart cool. What is needed is a multi-purpose cart that is suited to accommodate all of these various functions and be lightweight and maneuverable within the aircraft.

SUMMARY OF THE INVENTION

The present invention is a lightweight galley service cart preferably constructed from CFRC (carbon fiber reinforced composites) and combines two main sections to form a one piece chassis. The cart has four compartments for accommodating four fully loaded standard meal containers that can be installed directly into an aircraft galley conventional or steam oven for heating meals. The improved functionality of the cart allows the meals to be stored in the chilled carts in compact meal carriers at the start of cabin meal service, and where the whole loaded meal carrier can be installed in an oven and heated. On completing of the cooking cycle the carrier can then be returned to the cart and transported around the aircraft and served to the passengers without ever separating the meals into individual trays or components.

The cart in a preferred embodiment has CFRC "cap" doors to accommodate the additional length of the installed containers. To prevent lateral movement of the carriers within the cart, the carrier is retained by guides, and all four meal carriers can be installed from either side of the cart. The cap doors may preferably pivot or fold through 270 degrees to sit flush against the side of the cart while remaining within the allowable standard service cart exterior space envelope. Further, in order to secure the cap doors, in yet another preferred embodiment a double paddle latch is employed that has a four point locking system to ensure adequate retention of the cart door even in the event of a failure of one paddle mechanism. The cart door can also be secured manually in the event of both latches failing. A conventional foot brake arrangement is employed using lightweight materials.

DETAILED DESCRIPTION OF THE PREFERRED EMBODIMENTS

Figure 1A:
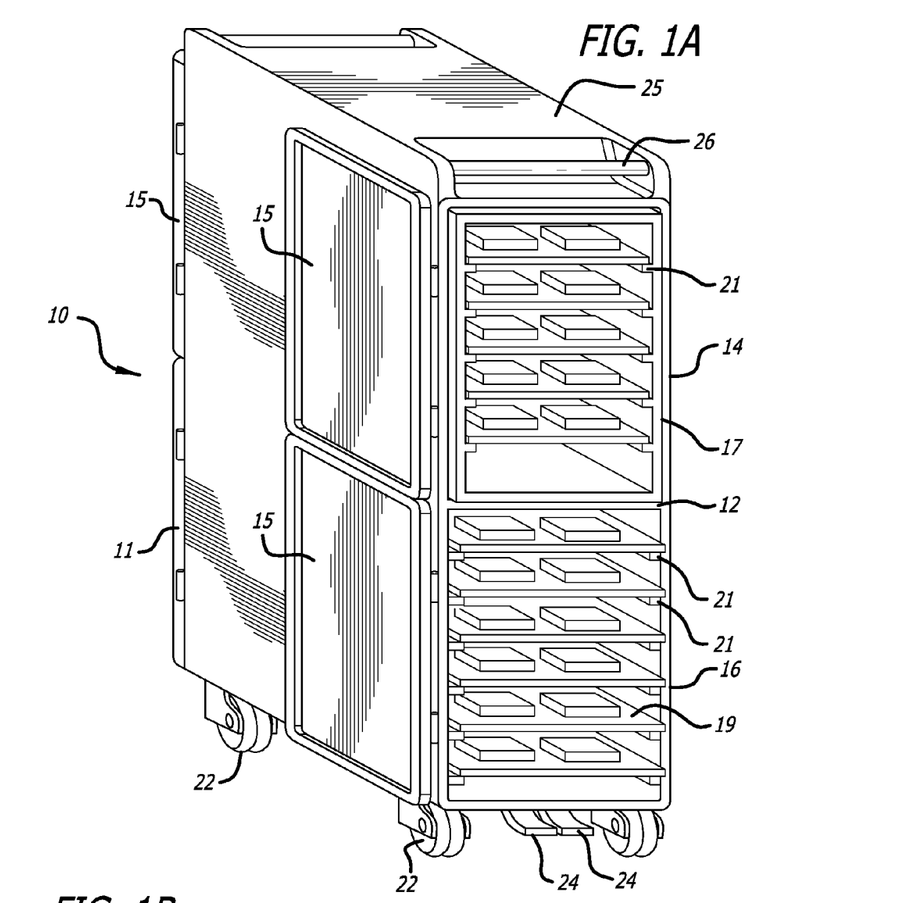
FIG. 1A is an elevated perspective view of a first embodiment of the present invention.

FIG. 1A illustrates a one piece, four compartment light weight food and beverage galley cart 10 for service of meals and beverages on an aircraft. The cart 10 may preferably be constructed of carbon fiber reinforced composites, or "CFRC," and comprises a generally rectangular frame 11 and a horizontal shelf 12 to divide the inner compartment into an upper half 14 and a lower half 16. Each half of the compartments 14, 16 can accommodate two intact standard meal carriers 17, such that the cart 10 can hold four complete meal carriers 17 despite its narrow profile. These storage of meal carriers 17 is convenient because they can be directly placed into a standard galley oven for heating prior to meal service, and then transferred back to the cart without removing the individual food trays. The cart also allows the meals to be stored in the thermally insulated carts within meal carriers instead of below deck storage, placed in ovens at the appropriate time, and then returned to the carts while still maintained in the carriers and transported around the aircraft to be served to the passengers. This represents a tremendous savings of time and work over individually loading and unloading the meals into the oven and then into the carts. Also, the multiple sections allow hot meals to be stored in the upper half 14 and cold meals stored in the lower half 16, and the hot meals do not have to be exposed while the cold meals are served to preserve their temperature.

The cart 10 has CFRC "cap" doors 15 that preferably extend beyond the body of the cart to accommodate the additional length of the installed carriers 17 holding the meals. The cap door 15 defines a hollow volume that can receive the proximal end of the carrier 17 and still allow the door to close. These cap doors 15, which are located at each end of the cart, preferably pivot about an arc of 270 degrees as shown in FIG. 1A to abut against the side of the cart 10. This pivoting of the door allows the cart to take up less space in an aisle and allow more movement by passengers or crew while the cart is located in the aisle.

Figure 1B:
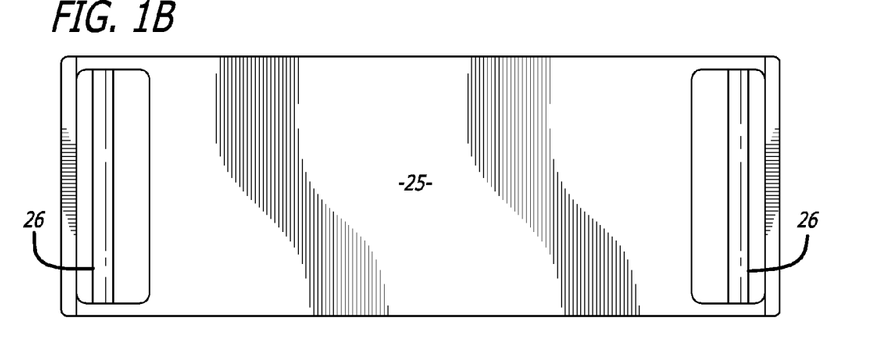
FIG. 1B is a top view of the embodiment of FIG. 1.

The inside of the compartments include preformed guides 21 that retain and stabilize the carriers 17 or meal trays 19 and prevent shifting and movement. The guides 21 secure both the carriers 17 and the trays 19, so that they can be separated if necessary (for example, hot meal carriers 17 on top and cool non-heated meals on the bottom). The cart 10 opens from the front and back, so that the carriers can be loaded from either side, and the server can access all four compartments easily and conveniently. The cart 10 is equipped with castors 22 or other types of wheels, which include brakes 24 that allow the cart 10 to be positioned and secured in the event of an inclination in the aircraft floor due to climbing or decent, or turbulence that could lead to movement of the cart 10. At each end of the cart 10 along an upper surface is a handle 26 that facilitates pushing and steering the cart (FIG. 1B). The cart may have a flat upper surface 25 to set meal carriers, hot meal components, beverages, or other items needed during the food and beverage service. To provide protection for the chassis, replaceable resilient silicon rubber inserts (not shown) may be employed at the periphery of the doors and along the sides of the cart.

Figure 2A:
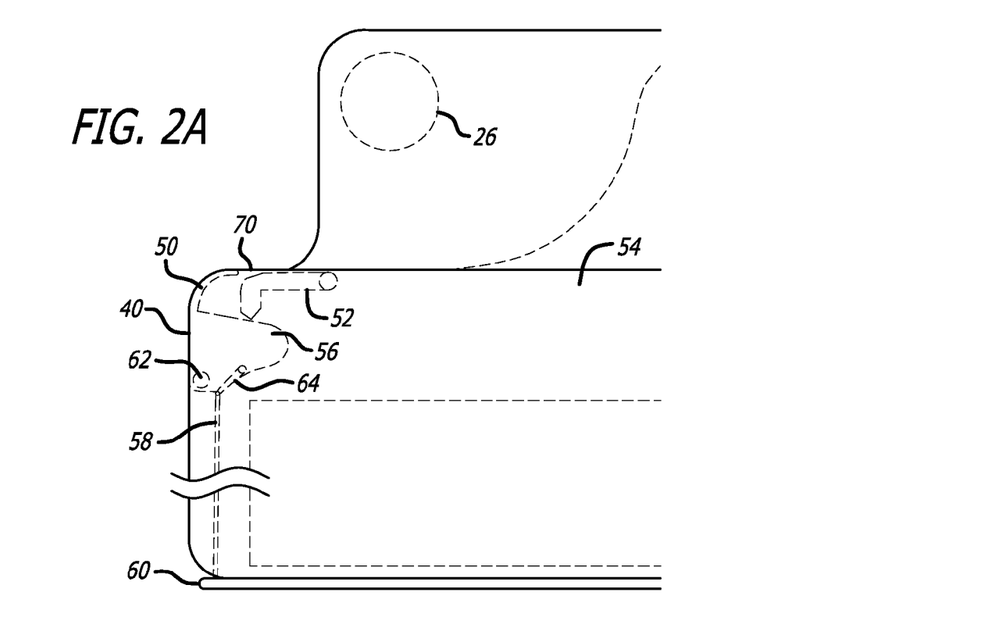
FIG. 2A is an enlarged view, partially in phantom, of the embodiment of FIG. 1 showing a four point locking latch.
Figure 2B:
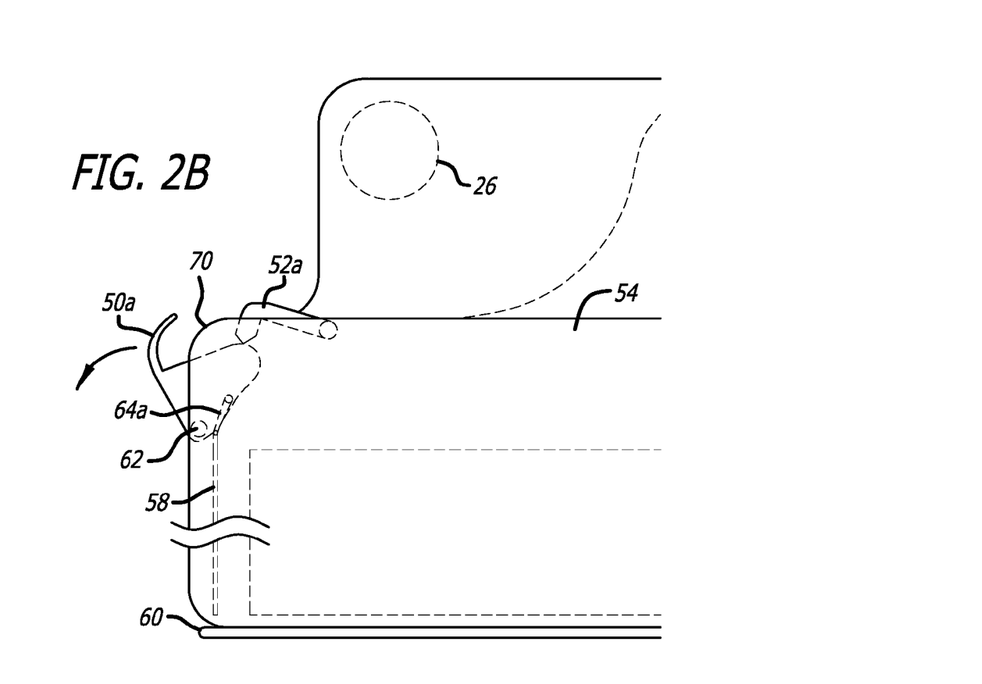
FIG. 2B is an enlarged view, partially in phantom, of the locking latch of FIG. 2A in the unlocked condition.
Figure 3A:
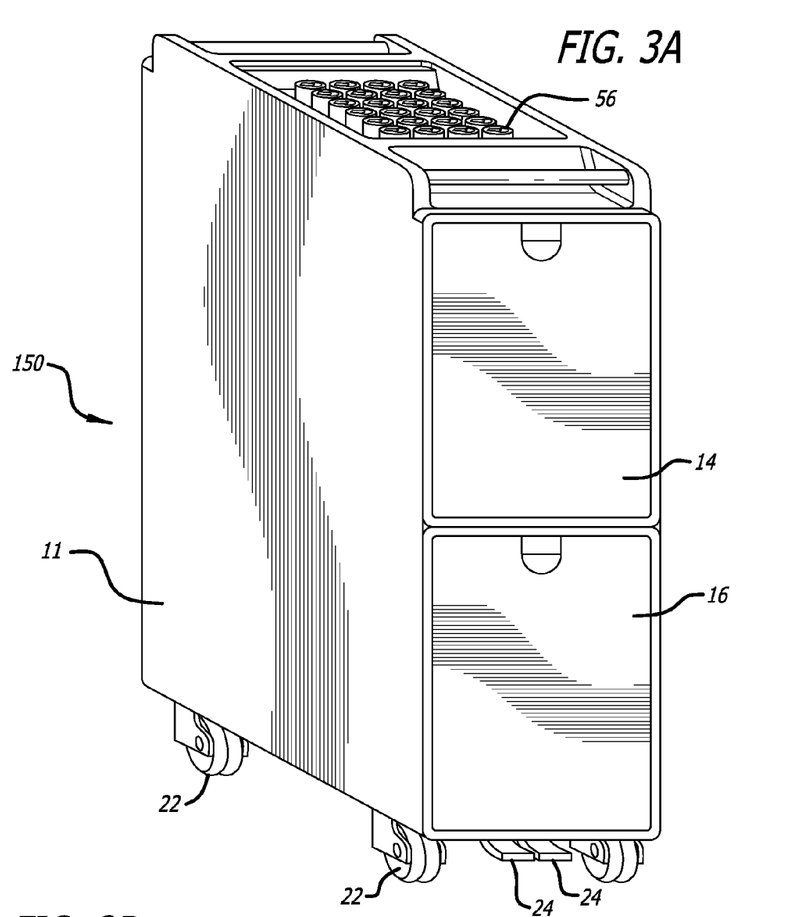
FIG. 3A is an elevated perspective view of another embodiment having a dry ice tray.
Figure 3B:
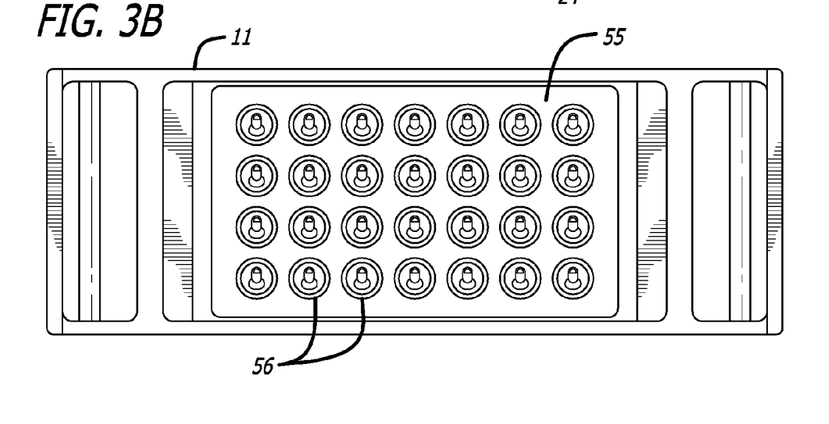
FIG. 3B is a top view of the embodiment of FIG. 3A.

In addition to the handle 26, the cart 10 may preferably be equipped at each end with a pair of four point locking paddle latches 40. These locking paddle latches have a double redundancy that ensures that the doors 15 to the cart 10 remain closed, even upon failure of one of the latches. The cart door can also be secured manually in the event of both latches failing. The paddle latch 40 is shown in FIGS. 2A and 2B, which illustrate its operation. In the locked position, the double paddles 50 rest flush with the upper surface 70 of the cart door as shown. The cart 10 may be equipped with slam latch levers 52 (shown in the locked position) that retain the top 54 of the door by engaging with a recessed notch or socket (not shown) in the door body. The opening cam 56 is in the horizontal position, and the door retention pins 58 extend down the door and engage with the pin engagement holes at the bottom 60 of the cart 10 to prevent the door from inadvertently opening. That is, the pins while in the cart floor hold the door closed and locked.

To open the cart door, the paddles 50 are pulled forward into the open position designated 50a in FIG. 2B, whereupon the latch 40 pivots around pivot pin 62, bringing the cam 56 into contact with the slam latch levers 52. The contact of the cam 56 with the slam latch levers 52 lift them upward, disengaging with the door at the top (slam latch levers designated 52a in this condition). The door bottom retaining pin levers 64 are simultaneously rotated to a detent position 64a (FIG. 2B), thereby withdrawing the retaining pins 58 at the bottom of the cart and holding the latch in the open position. With the pins 58 no longer engaged with the base of the cart, the door can open freely.

The latch 40 may be returned to the closed position for stowage. On closing the door, the cam 56 pushes the top latching levers 52 upward engaging the door automatically. The paddles 50 can either be rotated forward to manually lift the pins 58 when the latch is closed, or the paddles 50 may be spring loaded to allow upward movement when the latch is in the locked position (slam option).

FIGS. 3-6 illustrate variations for an interchangeable and reconfigurable module system that utilizes the free space immediately above the meal carriers of meal trays and between the grab handles. This allows an airline to have a range of differing functions for the same basic cart chassis. In FIGS. 3A and 3B, an open topped cart 150 is displayed that allows easy access to drinks 57 or other items the compartments without opening any doors. The open top surface 55 is not efficient for keeping items heated or cooled, so a temporary lid can be used in some cases to keep items hot or cold and form a shallow bin that can hold drinks on top of the cart 150.

Figure 4A:
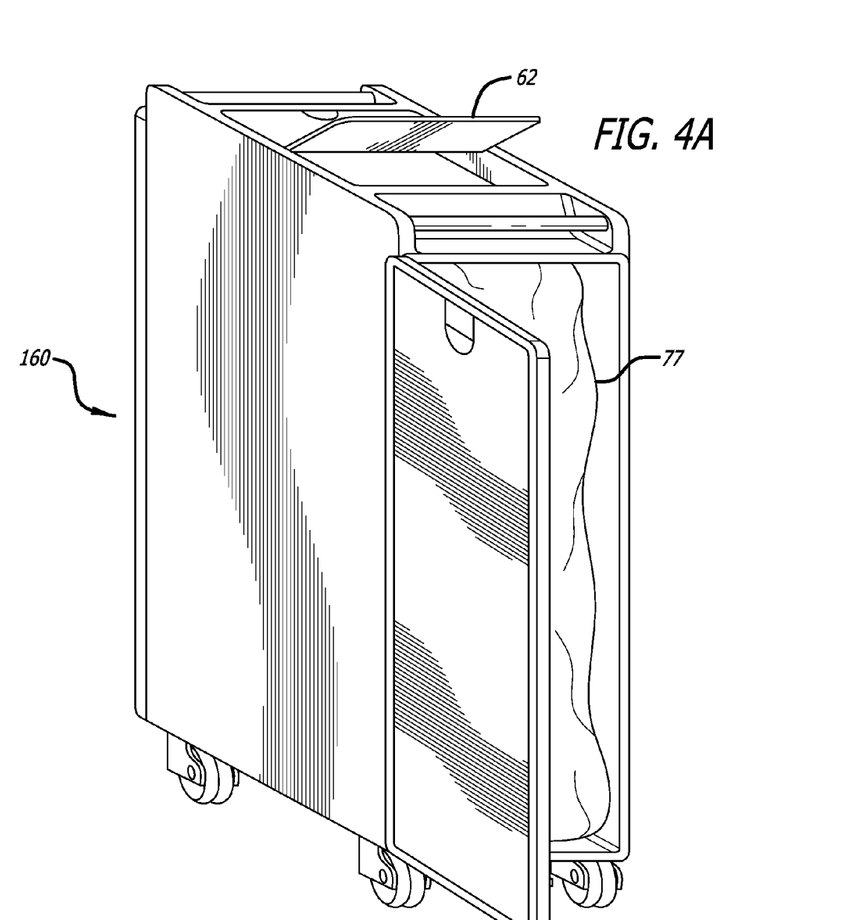
FIG. 4A is an elevated perspective view of another embodiment having pivoting top doors.
Figure 4B:
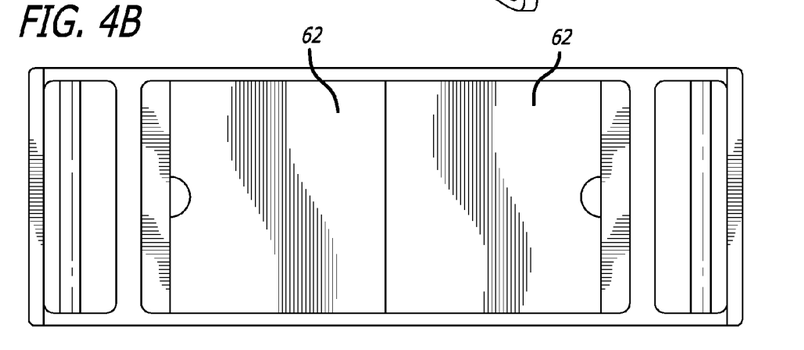
FIG. 4B is a top view of the embodiment of FIG. 4A.

FIGS. 4A and 4B illustrate a cart 160 with a pair of pivoting lids or covers 62 that open to allow access to the inner cart. This could be advantageous when serving hot or cold foods to keep the temperature more constant during the service. That is, one side could contain hot food and the other side cold beverages. Alternatively, this configuration could also be used as a waste collection unit after food and beverage service. The meal trays are replaced with trash cans, which are easily filled by raising the pivoting covers 62. One side could be used for recyclables, and the other side for trash and waste.

FIGS. 4A and 4B illustrates a trash and recycling option, where the cart 160 serves as a dual collection agent for collecting and storing trash and recyclable materials. A pivoting lid 62 can separate two bins within the cart for trash and recycling. Alternatively, the pivoting lid 62 can separate bins for other purposes such as snacks and trash, drinks and snacks, or the like. The compartments could preferably mount also plastic bags 77 that would preserve the sanitary condition of the cart's interior, so that no bins were needed.

Figures 5A, 5B:
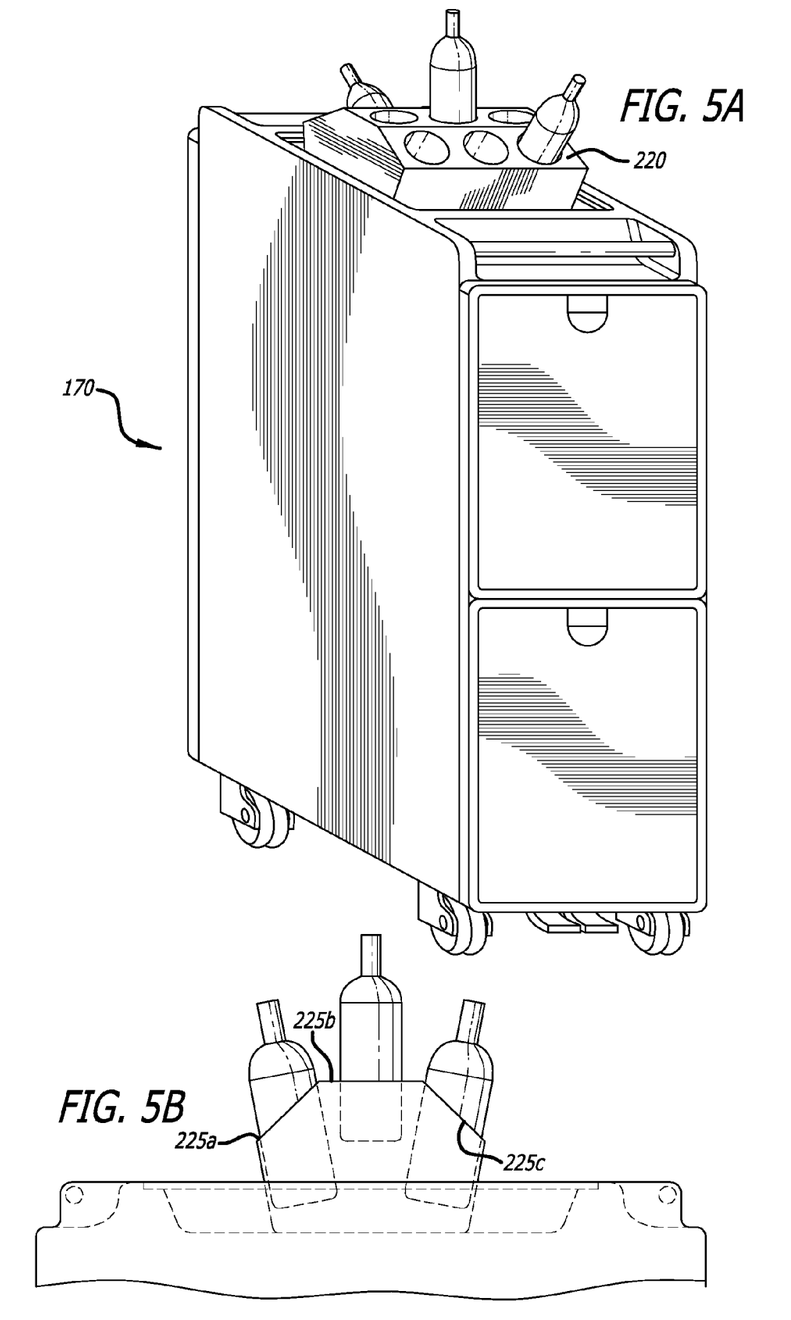
FIG. 5A is an elevated perspective view of another embodiment having a wine rack.
FIG. 5B is an enlarged side view, partially in phantom, of the top of the embodiment of FIG. 5A.
Figure 6A:
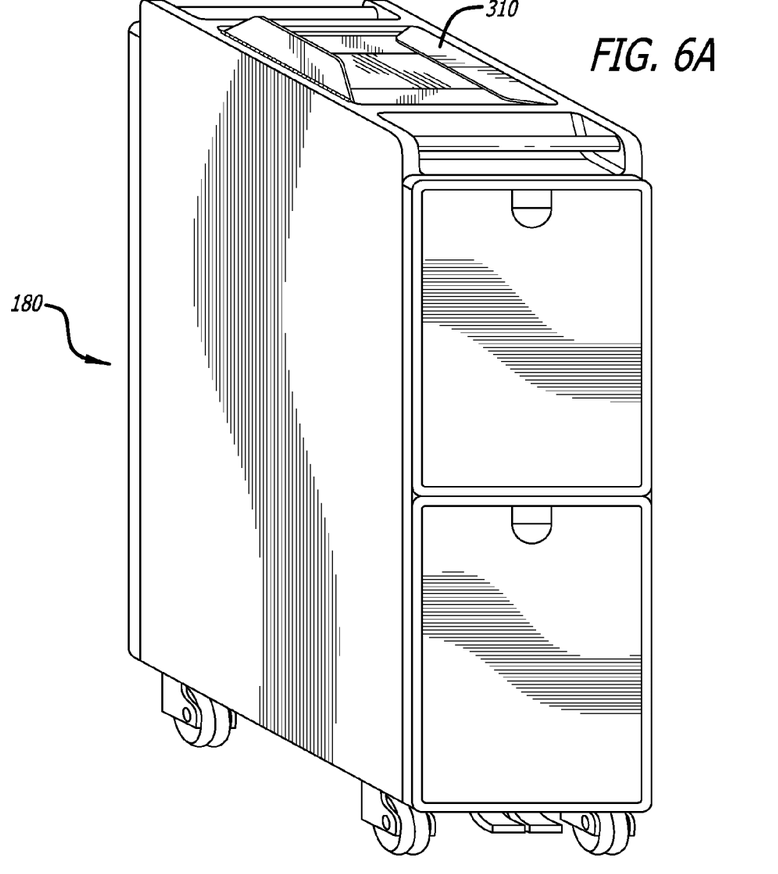
FIG. 6A is an elevated perspective view of another embodiment of the present invention.
Figure 6B:
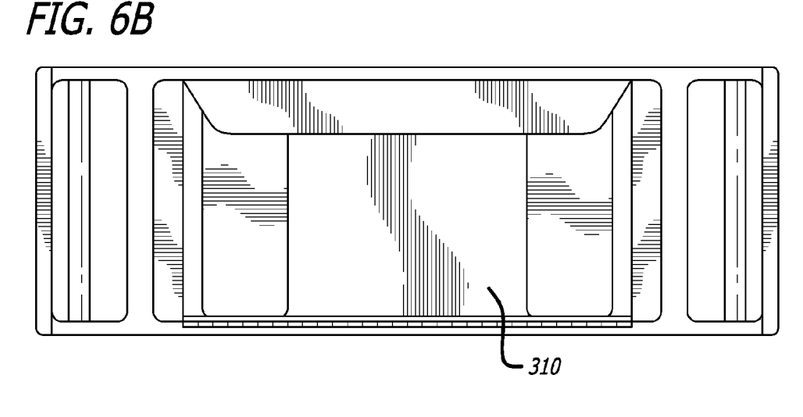
FIG. 6B is a cross-sectional side view of the top of the embodiment of FIG. 6A.

FIGS. 5A and 5B illustrate another configuration of the cart 170 of the present invention that includes on an upper surface a wine bottle holder 220. The wine bottle holder is modular component with three sides 225a,b,c, each with three cavities for holding a wine bottle. Of course, other configurations and sizes are available as well. The wine bottle holder 220 fits into a recess in the upper surface of the cart 170 and allows for wine service in addition to food and beverage service. FIGS. 6A and 6B illustrate another embodiment of a cart 180 with a shallow tray 310 option that can be used to store dry ice or similar cooling products to keep the contents of the cart 180 at a cooler temperature than ambient. In the event of a failure of the aircraft's cooling system, the meals can be stored in the cart in carriers and chilled using the shallow tray 310 filled with dry ice (not shown).

All installable options allow the installation of the cart in a KSSU, ACE or Atlas standard BWD chilled or un-chilled compartment (if designed for that size standard cart). The present invention provides many benefits of existing carts. The cart of the present invention reduces structural weight significantly by using CFRC's in its construction and components and eliminating heavy metallic parts where possible. It also allows the installation of up to four loaded oven meal carriers. The cart allows an option of separate double doors for the upper and lower divisions of the cart, and also allows the optional installation of loaded meal trays and meal carriers as desired with and without a double door option.

Other benefits of the present invention include the transport of heated and/or cold food separately within the cart during the passenger meal service periods, improving safety. Further, the cart allows an improved storage to oven to service cycle time, by eliminating individual meal handling and employs a centralized 4 point locking double paddle latch, or 3 point locking side mounted paddle latch. The cart of the present invention also employs CFRC "cap" door that improve door sealing, eliminate metalwork and can be fitted with an integrated hinge. Different configurations and modules can be added, and new modules can be included to suit customer requirements without changing the basic chassis. Importantly, all the cart configurations can be stored in standard cart bays.

I claim:

1. A service cart, comprising:
    a housing defining an interior compartment, said housing including wheels below a lower surface;
    a first and second pairs of doors at opposite ends of the service cart;
    a pivoting paddle latch mounted adjacent a top of said first pair of doors;
    a vertical pin coupled to said pivoting paddle latch, the vertical pin extending to the lower surface when said pivoting paddle latch is positioned in a closed position to prevent the first pair of doors from opening, and the vertical pin released from said lower surface when said pivoting paddle latch is positioned in an open position to allow said first pair of doors to open;
    a cam surface formed as part of the pivoting paddle latch, the cam surface rotating about a paddle pivot pin; and
    a lever engaging the first pair of doors, the lever disengaged from the first pair of doors by rotation of the cam surface.

2. The service cart of claim 1, further comprising a braking system for preventing movement of the cart.

3. The service cart of claim 2, wherein the cart includes on an upper surface a modular removable wine rack.

4. The service cart of claim 2, wherein an upper surface of the cart includes a pair of pivoting lids that open to separate containers.

5. The service cart of claim 1 further comprising a dry ice bin module.

6. The service cart of claim 1 further comprising an open upper surface with access to the cart's interior.

* * * * *